(12) United States Patent
Bujak (10) Patent No.: US 10,098,068 B2
(45) Date of Patent: Oct. 9, 2018

(54) POWER OPTIMIZATION SYSTEM AND METHOD FOR LOW POWER DEVICES

(71) Applicant: SEMICONDUCTOR COMPONENTS INDUSTRIES, LLC, Phoenix, AZ (US)

(72) Inventor: Daniel Bujak, Waterloo (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 72 days.

(21) Appl. No.: 15/271,005

(22) Filed: Sep. 20, 2016

(65) Prior Publication Data

US 2017/0238256 A1    Aug. 17, 2017

Related U.S. Application Data

(60) Provisional application No. 62/294,448, filed on Feb. 12, 2016.

(51) Int. Cl.
*H04W 52/02* (2009.01)
*H04R 25/00* (2006.01)
*H04W 56/00* (2009.01)
*H04W 76/10* (2018.01)
*H04W 76/19* (2018.01)

(52) U.S. Cl.
CPC ..... *H04W 52/0241* (2013.01); *H04W 56/001* (2013.01); *H04W 76/19* (2018.02); *H04R 25/55* (2013.01); *H04R 2225/55* (2013.01); *Y02D 70/00* (2018.01)

(58) Field of Classification Search
CPC .............. H04R 2225/55; H04R 25/30; H04W 52/0241; H04W 56/001; H04W 76/028; Y02B 60/50
See application file for complete search history.

(56) References Cited

U.S. PATENT DOCUMENTS

| | | | | |
|---|---|---|---|---|
| 9,668,209 | B1* | 5/2017 | Knaappila | H04W 52/0209 |
| 2005/0182306 | A1* | 8/2005 | Sloan | A61B 5/0002 |
| | | | | 600/300 |
| 2014/0211973 | A1* | 7/2014 | Wang | H04W 4/02 |
| | | | | 381/315 |
| 2015/0109978 | A1* | 4/2015 | Berntsen | H04W 52/0216 |
| | | | | 370/311 |
| 2015/0230285 | A1* | 8/2015 | Park | H04W 76/028 |
| | | | | 455/41.2 |
| 2016/0241989 | A1* | 8/2016 | Chen | H04W 4/008 |
| 2016/0249356 | A1* | 8/2016 | Pope | H04W 4/008 |
| 2017/0078954 | A1* | 3/2017 | Zakaria | H04W 48/16 |
| 2017/0325127 | A1* | 11/2017 | Raghu | H04W 28/14 |

* cited by examiner

*Primary Examiner* — Kashif Siddiqui
(74) *Attorney, Agent, or Firm* — Robert F. Hightower (57) ABSTRACT

An apparatus includes a receiver and a controller. The receiver receives a wireless stream with ongoing bursts that are transmitted at recurring periodic intervals. Each burst comprising one or more data packets. The controller controls the receiver to, when the wireless stream is lost for at least a specified quantity of intervals, search for the bursts during each interval, at a successive one of multiple equally-spaced sub-intervals of each interval.

20 Claims, 7 Drawing Sheets

POWER OPTIMIZATION SYSTEM AND METHOD FOR LOW POWER DEVICES

CROSS REFERENCE TO RELATED APPLICATION

This application is related to and claims priority under 35 U.S.C. § 119 to U.S. Provisional Patent Application No. 62/294,448, filed Feb. 12, 2016, entitled "Power Optimization System and Method For Low Power Devices," the entire contents of which is incorporated herein by reference for all purposes.

TECHNICAL FIELD

Aspects of the present disclosure relate to voltage regulators and, in particular, to a power optimization system and method for low power devices.

BACKGROUND

A hearing aid or deaf aid is a type of low power battery operated device that is designed to amplify sound for the wearer, usually with the aim of making speech more intelligible, and to correct impaired hearing as measured by audiometry. In the United States, Hearing aids are considered medical devices and are regulated by the Food and Drug Administration (FDA). Ordinary small audio amplifiers or other plain sound reinforcing systems cannot be sold as "hearing aids".

SUMMARY

According to one aspect, an apparatus includes a receiver and a controller. The receiver receives a wireless stream with ongoing bursts that are transmitted at recurring periodic intervals. Each burst comprising one or more data packets. The controller controls the receiver to, when the wireless stream is lost for at least a specified quantity of intervals, search for the bursts during each interval, at a successive one of multiple equally-spaced sub-intervals of each interval.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters may refer to the same parts throughout the different views. The drawings depict only typical embodiments of the present disclosure and, therefore, are not to be considered limiting in scope.

DETAILED DESCRIPTION

Embodiments of the present disclosure provide a power optimization system and method in which a receiver of a small, low power device is turned on and off for reducing the load on a low power battery that powers the device. As wireless communication devices become smaller, the sizes of batteries used to power these devices have also become smaller. Nevertheless, a reduced battery size can create problems, such as reduced battery life, and reduced instantaneous current load. Embodiments of the power optimization system provide a solution to these issues, among others, by detecting a wireless stream by, among other things, turning on a receiver of the device only when the stream is expected, and selectively scanning for a wireless signal when a wireless communication session is lost, thus enabling re-establishment of the wireless communication session with reduced drain on its battery.

Battery usage should be reduced to increase battery life when used in devices. Additionally, current draw peaks should also be reduced to prevent over-current conditions and damage to small batteries. Nevertheless, many communication techniques used by small wireless communication devices often consume undue amounts of power in order to function properly. For example, many wireless communication devices often use digital communication protocols due to their superior fidelity over analog communication techniques; but these communication protocols often require a synchronization sequence in order to provide for proper reception of digital data commonly provided as data packets. However, conventionally implemented synchronization sequences are relatively energy inefficient because they must often be used for several synchronization periods to 'find' the signal while not providing any useful transferal of data.

Figure 1:
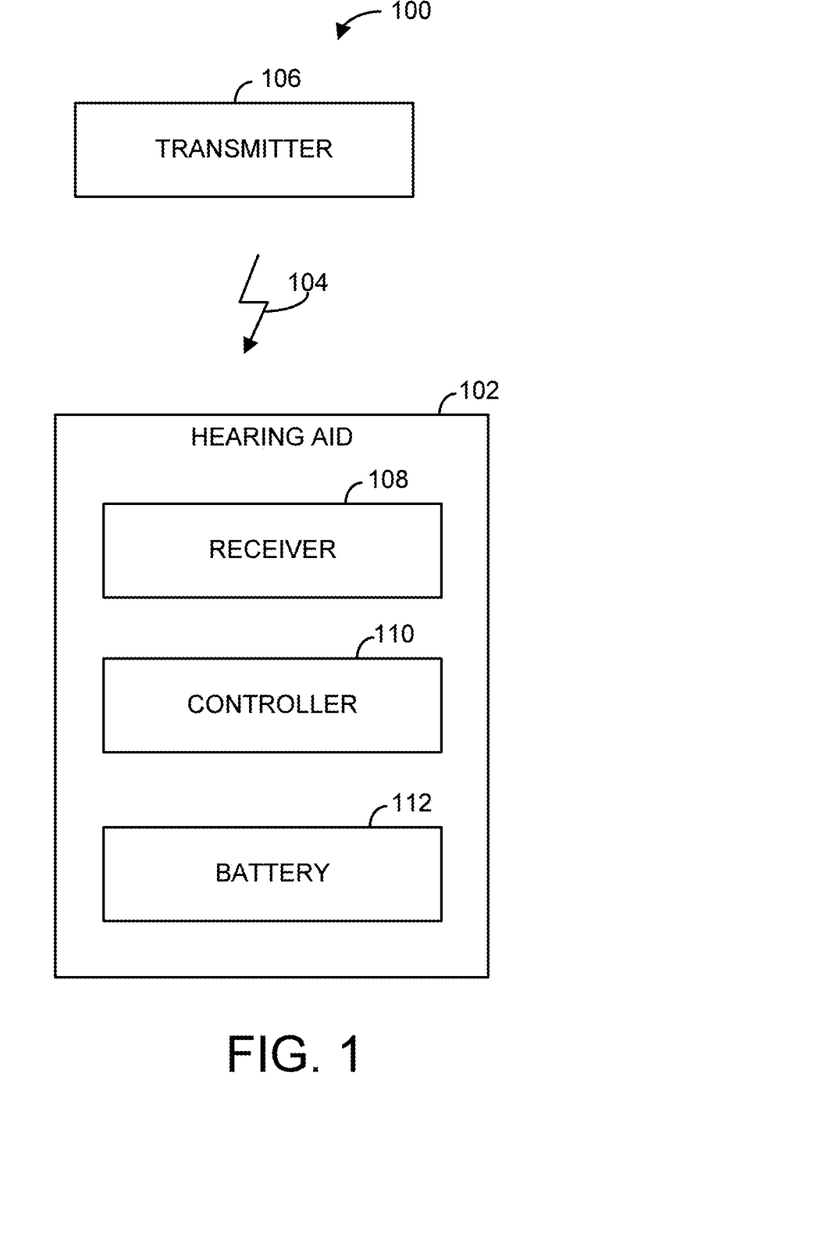
FIG. 1 illustrates an example power optimization system according to one embodiment of the present disclosure.

FIG. 1 illustrates an example power optimization system 100 according to one embodiment of the present disclosure. The power optimization system 100 generally includes a receiver 102 that is configured to receive a wireless stream 104 using any suitable medium, such as radio-frequency (RF) signals, or other suitable form of modulated energy (e.g., infrared light, ultrasound, etc.) from a remotely configured transmitter 106. The receiver 102 includes a receiver 108 that receives and processes the wireless stream 104 transmitted from the transmitter 106, a controller 110 that controls the operation of the receiver 108, and a battery 112, which may be a low power battery, that is used to power the receiver 108 and the controller 110. Although the power optimization system 100 is described herein as being implemented on a transmitter 106 and a receiver 102 that is operated in simplex mode (e.g., one way communication), it should be understood that the power optimization system 100 may be implemented on any wireless communication system including those that operate in a duplex (e.g., two way communication) mode.

In one embodiment, the receiver 102 comprises a hearing aid while the transmitter 106 comprises a separately configured apparatus that transmits audio data to the hearing aid via the wireless stream 104. For example, the transmitter may be housed in a relatively small enclosure that can be placed at a remote location from the hearing aid such that it may, using an onboard microphone, receive and process audio energy proximate the transmitter, and transmit the audio information to the hearing aid for listening by a user. Such an arrangement may be useful in scenarios where a user with a hearing aid may be able to listen to audio information that would be otherwise difficult to receive and process when the audio energy to be listened to is a relatively long distance away. One particular scenario may include, for example, a classroom setting where the hearing aid, which is worn by the user, may be located in the back of a classroom, while the transmitter 106 is placed proximate a teacher who is lecturing in a large room. Nevertheless, it is contemplated that any arrangement of wireless communication systems using receivers with low power batteries may be implemented with the power optimization system 100 according to the teachings of the present disclosure.

Typically when searching for a wireless stream, conventional receivers are turned on continually to search for a transmitted signal. However, for low power devices, such as hearing aids, turning on the receiver long enough to search for all the possible channels and intervals often causes an undue load on low power batteries that power these low power devices. This problem may be particularly problematic when the wireless stream comprises a digital wireless stream that relies upon relatively precise synchronization in order to properly receive and send data. Embodiments of the present disclosure provide an enhanced communication protocol that turns on the receiver on for short periods of time so that one or more intervals of a signal may be effectively scanned without undue drain on the battery that powers the receiver. In order to compensate for the fact that the receiver 108 is not on for long enough to scan the entire frequency band and time interval, the receiver 108 will be turned on repeatedly at different times and on different intervals until it is able to detect the signal. Further, when the stream drifts such that that it becomes lost, the power optimization system 100 provides from a relatively quick technique of resynchronizing that may not require a continual scanning mode, which is power intensive and therefore inefficient.

Figure 2:
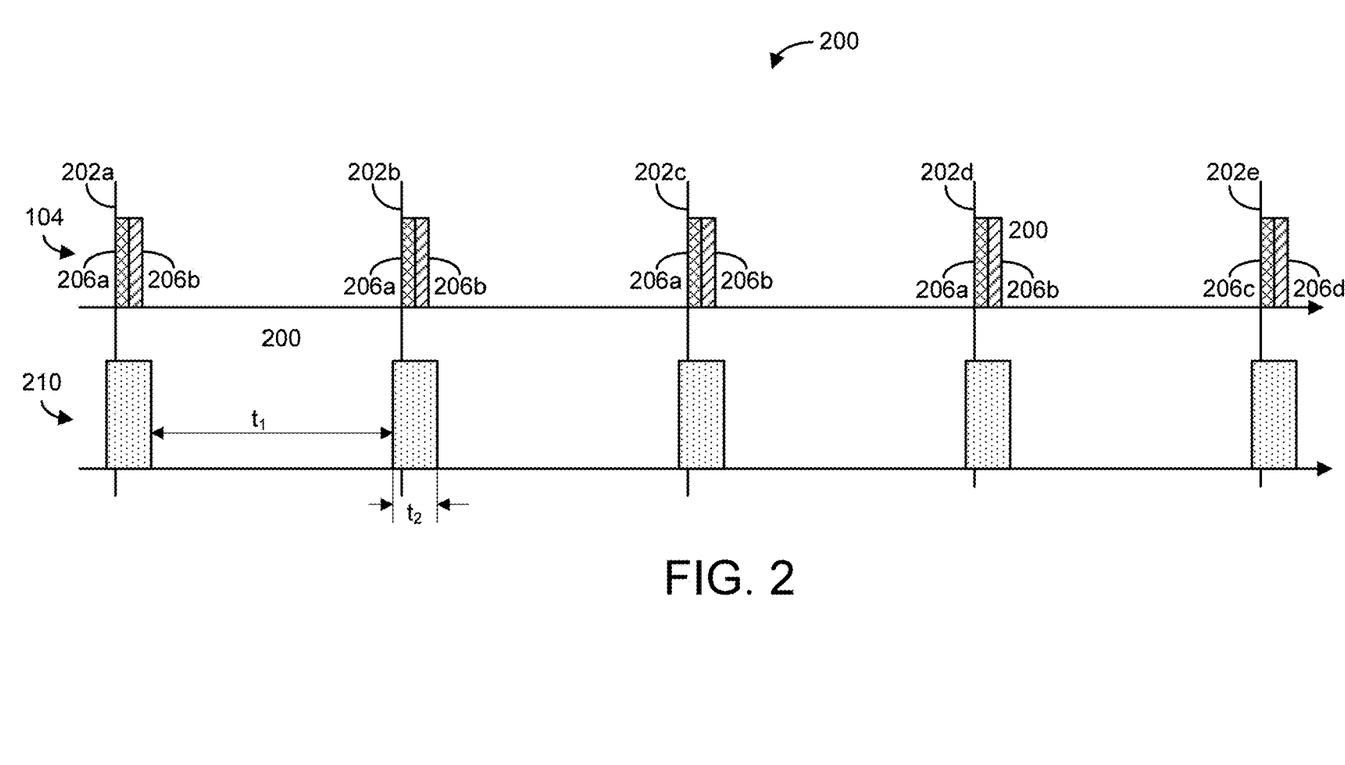
FIG. 2 illustrates an example wireless stream acquisition mode that may be performed by the power optimization system to reduce power usage according to one embodiment of the present disclosure.

FIG. 2 illustrates an example wireless stream acquisition mode 200 that may be performed by the power optimization system 100 to reduce power usage according to one embodiment of the present disclosure. In general, the wireless stream acquisition mode 200 may be performed when the receiver 102 is synchronized with the wireless stream 104 to receive and process data included in the wireless stream 104. The wireless stream 104 includes a series of ongoing bursts 202 that are transmitted at recurring intervals 204 in which each burst 202 comprises two data packets 206 associated with an audio signal transmitted by the transmitter 106. In one embodiment, the wireless stream 104 conforms to a Nordic enhanced shockburst (ESB) protocol. Nevertheless, it is contemplated that the teachings of the present disclosure may be applied to any type of transmission protocol for, among other things, reduction in power usage by circuitry that receives and processes wireless communications.

The wireless stream 104 is transmitted in simplex mode (e.g., one way communication) in which the transmitter 106 transmits the wireless stream 104 to the receiver 102 without expecting any acknowledgement from the receiver 102. Additionally, the transmitter 106 is configured to transmit two data packets 206a and 206b during each burst 202, while forward error correction is provided by sending each data packet a specified quantity of times, which in this particular example is four times. That is, the transmitter 106 will transmit the two data packets 206a and 206b during each burst 202, and will repeat this for a specified quantity of times (e.g., four times) before sending the next two packets 206c and 206d. The interval between each successive burst 202 may be any suitable duration. In the present example, the interval between each successive burst 202 is 3.75 milliseconds.

The power optimization technique of FIG. 2 may be performed while the receiver 102 is synchronized with the wireless stream 104. Because the receiver 102 is synchronized with the wireless stream 104, it has knowledge of when each burst is to be expected. Additionally, because the receiver 102 has knowledge of the duration of each burst 202, its receiver can be turned on when the bursts are expected to be received, and turn the receiver off when the bursts are not expected to be received. To enhance reliability, the receiver may be turned on shortly before the burst 202 is to be expected and turn off the receiver 108 shortly after the expected duration of the burst 202. A receiver section control plot 210 shows how the receiver 108 may be controlled to provide the wireless stream acquisition mode 200. Time t1 indicates a period of time in which the receiver 108 is turned on, while time t2 indicate a period of time in which the receiver 108 is turned off to conserve power.

In cases where the transmitter 106 and receiver 102 are functioning well and are placed in a relatively noise-less environment, the receiver 102 may then properly detect the data packets 206a and 206b during a first initial burst 202a. Therefore, according to one embodiment, if the receiver 102 properly detects the data packets 206 in the first burst 202a, the receiver 102 may be shut off on the next three ensuing bursts 202b, 202c, and 202d, and be turned back on during the fifth burst 202e to receive the next data packets in the wireless stream 104. However, if the data packets 206a and 206b are not properly detected in the first burst 202a, the receiver 108 will be turned off until the second burst 202b in which reception of the missed data packets 206a and 206b will again be attempted.

The receiver 108 will then be turned on during each ensuing burst 202c, 202d, and 202e until reception of a new set of data packets 206e are properly received. According to the ESB protocol, individual data packets 206 are identified by a two bit packet identification (ID) field in each packet header that may be used by the receiver to distinguish a new packet from a previously received data packet. Thus, the receiver 102 may read the packet ID field to determine whether a new set of data packets 206e are being received to trigger repeating the power optimization technique described herein above for ensuing receipt of additional data packets.

Figure 3:
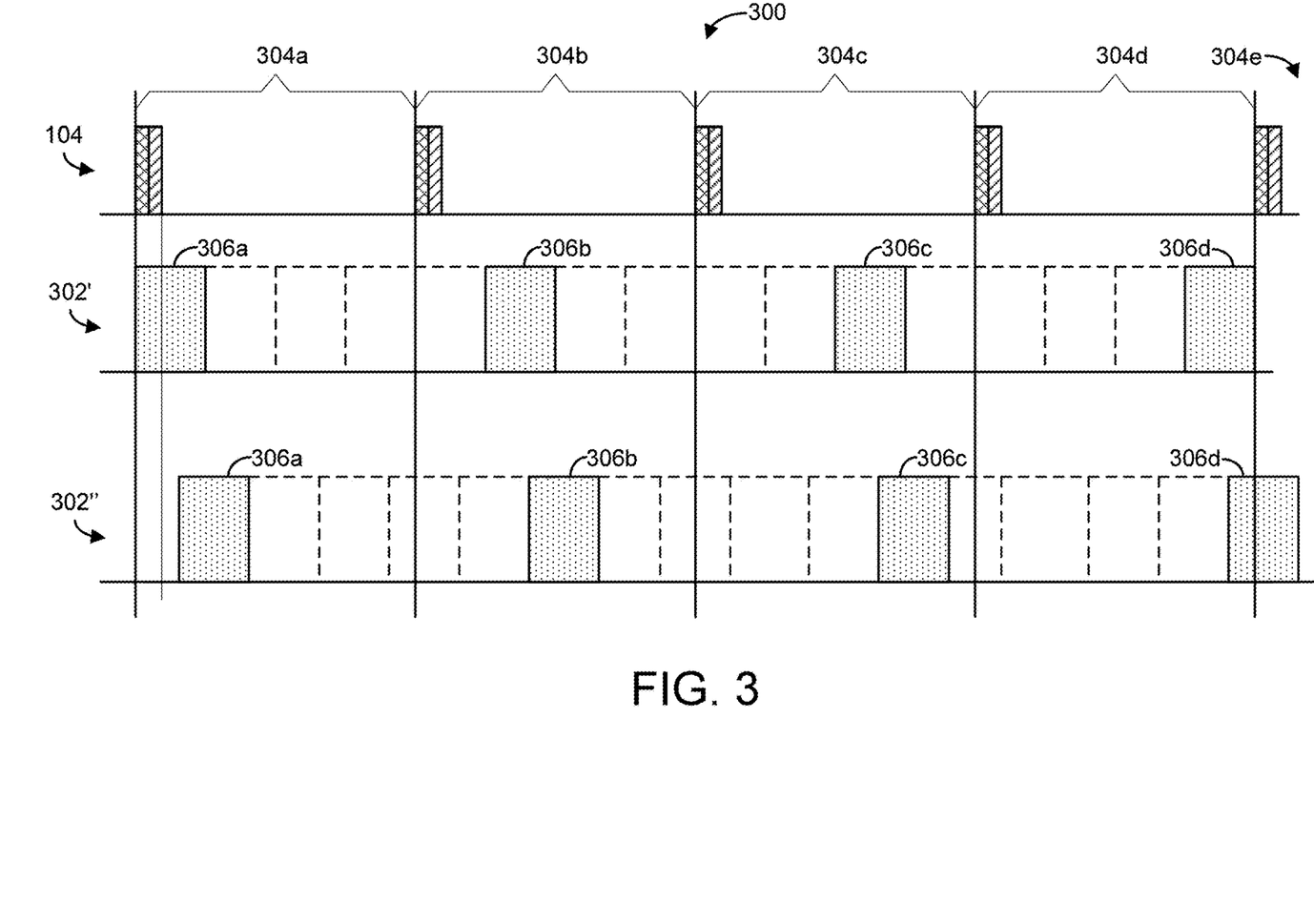
FIG. 3 illustrates another example power optimized search mode that may be performed by the power optimization system to reduce power usage according to one embodiment of the present disclosure.

FIG. 3 illustrates another example power optimized search mode 300 that may be performed by the power optimization system 100 to reduce power usage according to one embodiment of the present disclosure. The power optimized search mode 300 may be performed when the receiver 102 is not synchronized with the wireless stream 104, such as following initial power on of the receiver 102 or after a relatively long period of time in which the receiver 102 has not been synchronized with the wireless stream 104. In this case, the receiver 102 does not know when to expect the bursts within the wireless stream 104. Before detecting the stream, the receiver does not know when inside each interval the packet will be sent. The controller 110 would otherwise control the receiver 108 to listen continuously (e.g., continuous search mode) throughout each consecutive interval on all available channels until the stream is detected; however, this would be relatively power intensive. Rather, the receiver 108 is turned on for only a fraction of each interval. This fraction is big enough to guarantee that if it swept through the whole interval at least one of the two packets will be detected. If for example the two transmitted data packets are 250 microseconds each, then the receiver would be turned on for 500 microseconds to guarantee at least one of the two data packets would be detected.

A first search sequence 302' shows how the controller 110 periodically turns on the receiver 108 to search for the wireless stream 104. When searching for the wireless stream, the controller 110 periodically turns on the receiver 108 during each interval 304, at a successive one of multiple equally-spaced sub-intervals 306 of the interval 304. For example, the receiver 108 may be turned on at a first sub-interval 306a that is in the first quartile (e.g., 25 percent) of a first interval 304a, at a second sub-interval 306b that is in the second quartile of a second interval 304b, at a third sub-interval 306c that is in the third quartile of a third interval 304c, and at a fourth sub-interval 306d that is in the fourth quartile of a fourth interval 304d. Thus, through a successive progression of four intervals, the receiver 108 may be turned on for a sufficient duration to detect and synchronize from at least one of the bursts of the wireless stream 104.

Although the intervals (304a-304d) of the first search sequence 302' are shown as being aligned with the bursts of the wireless stream 104, when the receiver is not synchronized with the wireless stream 104, the receiver 102 has no knowledge of when the bursts are sent before synchronization. Thus, for example, the receiver 108 may be initially turned on during the first interval 304a, synchronized with but not the beginning of the interval, as is shown in the second search sequence 302" and not find any burst from the wireless stream 104. Additionally, the receiver 108 may be turned on at successive ones of multiple equally-spaced sub-intervals 306b, 306c, and 306d without finding a burst to synchronize with. However, when the receiver 108 is turned on during a fourth interval 304d, a burst may be found from which to synchronize with the wireless stream 104. Thus, the receiver 108 may be turned on at successive periodic intervals to find and sync from a burst while using a fraction, in this case 25 percent, of the power required by conventional signal synchronization schemes. Although the sub-intervals in this particular example are divided into four equally-spaced sub-intervals 306 of each interval 304, it should be understood that any quantities of sub-intervals may be implemented such as two sub-intervals, three sub-intervals, or more than four sub-intervals.

Figure 4:
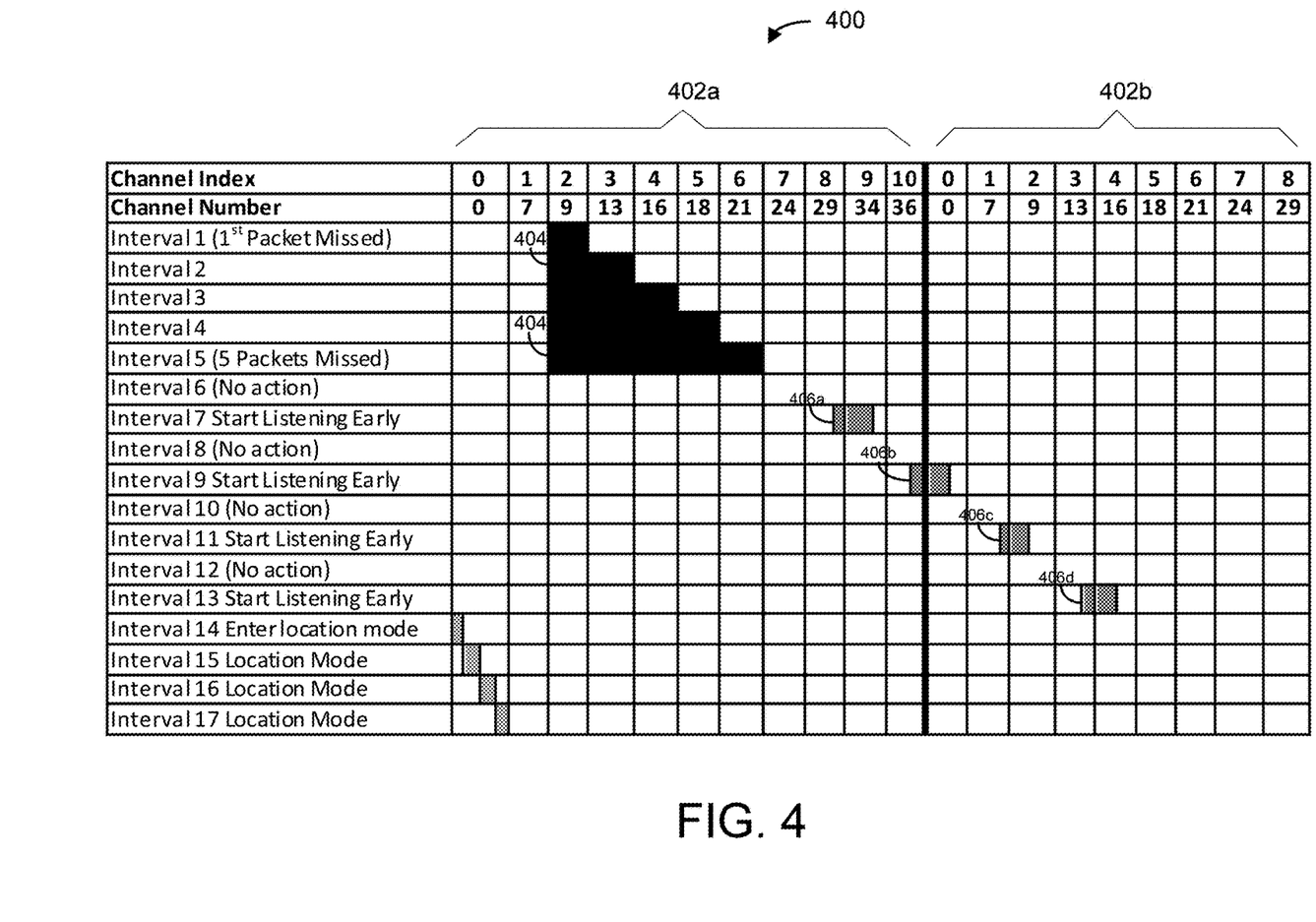
FIG. 4 illustrates an example power optimized re-synchronization mode that may be performed by the power optimization system to reduce power usage according to one embodiment of the present disclosure.

FIG. 4 illustrates an example power optimized re-synchronization mode 400 that may be performed by the power optimization system 100 to reduce power usage according to one embodiment of the present disclosure. The power optimized re-synchronization mode 400 may be performed when the receiver 102 has recently lost synchronization with the wireless stream 104, such as may be encountered when the receiver 102 misses a short series of bursts due to interference or other brief obstruction of the stream.

The power optimized re-synchronization mode 400 is represented by a table in which each row in the table represents an interval during which a burst will be transmitted, while each column of the table represents one of ten channels provided by the Nordic ESB protocol. It should be understood, however, that the power optimized search mode may be implemented with other protocols that use other quantities of channels, such as more than ten channels or fewer than ten channels. In general, the table indicates how the Nordic ESB protocol generates the wireless stream. For example, the a first frame 402a and a portion of a second frame 402b is shown in which certain channels are sequentially transmitted at specified intervals.

In some cases, the wireless stream may be lost due to unexpected drift in timing on the transmitter, receiver or both. When this happens it is possible to use some re-detection techniques that require less power than performing the power optimized search mode 300 or a continual search mode. In the particular example shown, the data packets transmitted during intervals 1 through 5 are missed. The black cells 404 in the table indicate missed data packets. Because in this example, the controller 110 is configured to determine that the wireless stream 104 has been lost after missing the bursts in five adjacent intervals, the controller 110 determines that synchronization has been lost and will attempt to recapture it at ensuing intervals. Therefore, when the wireless stream 104 is lost for a specified quantity of intervals (e.g., five intervals), the controller 110 skips searching for the wireless stream 104 at the next interval (e.g., interval 6), and searches, via sub-interval 406a, for the wireless stream 104 starting at an interval after the next interval (e.g., interval 7) for a duration that is twice a duration of the bursts. That is, the controller 110 skips one interval (e.g., interval 6) and expands the listen window (e.g., turns the receiver 108 on) for the next interval to be open slightly before and slightly after when the burst is expected to arrive. By doing this, the controller 110 is able to detect a wireless stream that has drifted ahead or back to re-synchronize with the wireless stream. If the re-synchronization attempt fails, the controller 110 may repeatedly attempt the power optimized search mode 300 for a specified quantity of times (e.g., 5 intervals), via sub-intervals 406b-406d, before reverting to a continual signal search mode (e.g., full scanning technique).

Figure 5:
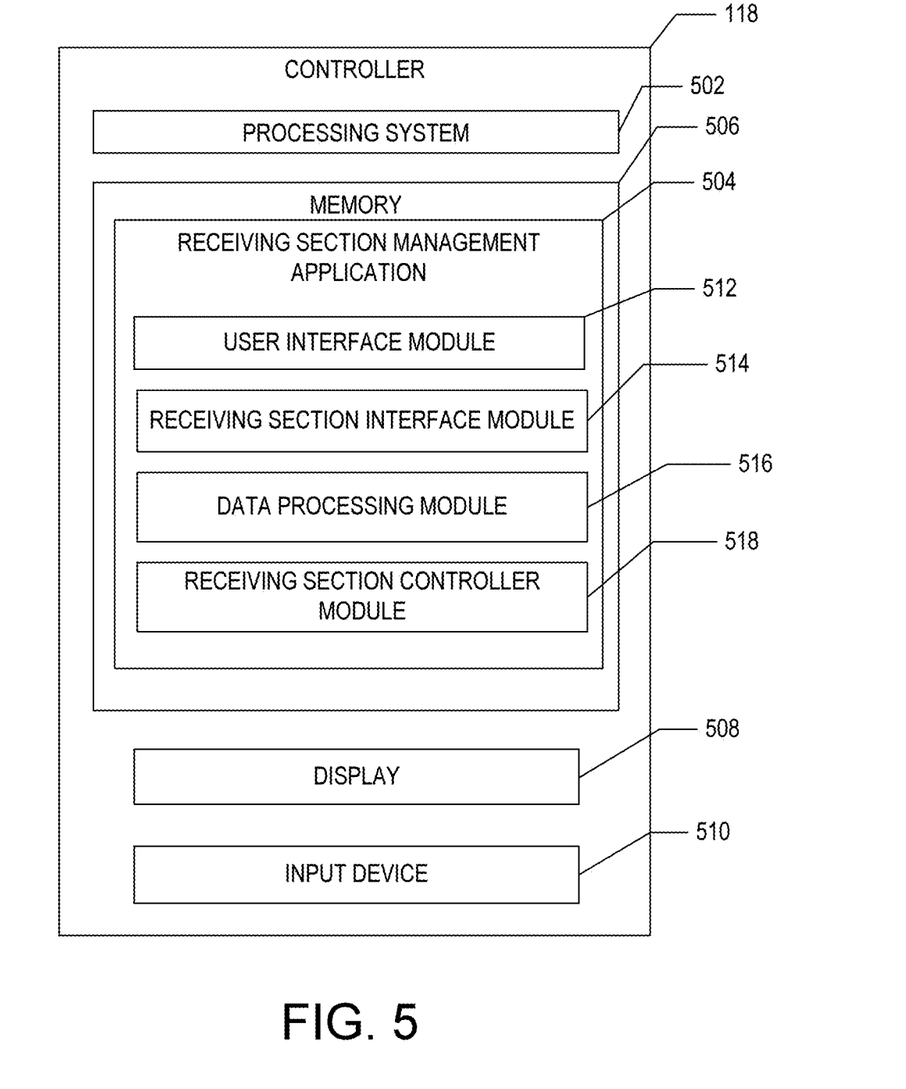
FIG. 5 illustrates one example of the controller that may be used to control the operation of the receiver according to one embodiment of the present disclosure.

FIG. 5 illustrates one example of the controller 110 that may be used to control the operation of the receiver 108 according to one embodiment of the present disclosure. The controller 110 includes a processing system 502 that executes a receiver management application 504 stored in a memory 506 (e.g., computer readable media). Although the controller 110 is shown and described as a computer-based design incorporating instructions stored in a memory 506 and executed by a processor 502, it should be understood that the controller 110 may be embodied in other specific forms, such as using discrete and/or integrated analog circuitry, field programmable gate arrays (FPGAs), application specific integrated circuitry (ASICs), or any combination thereof. Additionally, the controller 110 may be omitted if manual operation of the receiver 100 is desired.

The processing system 502 includes one or more processors or other processing devices and memory. The one or more processors may process machine/computer-readable executable instructions and data, and the memory may store machine/computer-readable executable instructions and data including one or more applications, including the application 504. A processor is hardware and memory is hardware. The memory 506 includes random access memory (RAM) and/or other non-transitory memory, e.g., a non-transitory computer-readable medium such as one or more flash disks or hard drives. The non-transitory memory may include any tangible computer-readable medium including, for example, magnetic and/or optical disks, flash drives, and the like.

The controller 110 may also include a display 508, such as one or more light emitting diodes (LEDs), liquid crystal diodes (LCDs), vibration generating device, or other type of device, that provides information to the user. For example, the display 508 may include an audio circuit or algorithm that provides information to the user via a speaker or other sound generating device configured on a hearing aid. The controller 110 may also include an input device 510, such as one or more buttons, switches, or other electro-mechanical device for providing user input to the application 504. Nevertheless, the display 508 and/or input device 510 may be omitted if not needed or desired.

In general, the processing system 502 executes a receiver management application 504 with one or more modules to control the operation of the receiver 100. In certain embodiments, the application 504 may control all operating aspects of the receiver 100 described herein. In other embodiments, the application 504 may control only one or a subset of the operating aspects of the receiver 100 described herein.

A user interface module 512 facilitates the receipt of user information and/or other communications from the input device 510 of the controller 110. In one example, the controller 110 provides information via the display and receives user input via one or more switches configured on the receiver 102 to control its operation (e.g., turn the power optimization system 100 on or off, adjust power optimization system setting, etc.).

A receiver interface module 514 communicates with the receiver 108 to receive data packets received by the receiver 108 and forward the received data packets to the data processing module 516 as well as perform other functions associated with operation of the receiver 108, such as passing header information included in each packet to the data processing module 516. For example, the receiver interface module 514 may receive data packets from the receiver 108, process those packets to determine whether a valid packet has been received and forward the results of the determination to the data processing module 516. Additionally, the receiver interface module 514 may be responsive to the receiver controller module 618 to control turning the receiver 108 on and off for reducing load upon the battery 112.

A data processing module 516 processes the received data packets in order to control turning on and off the receiver 108 for reducing load upon the battery 112. For example, the data processing module 516 may control the receiver 108 to turn the receiver 108 off once a valid packet has been received so that power draw from the battery 112 may be reduced. If the transmitter is configured to redundantly transmit each data packet a specified quantity of times, such as for providing forward error correction, the receiver interface module 514 may, upon determining that a data packet has been successfully received, control the receiver 108 to turn off when ensuing redundant data packets are expected to be received such that battery power is preserved. Additionally, the data processing module 516 may include timing sequences for searching for the wireless stream 104 when the receiver 102 is not synchronized with the wireless stream 104.

A receiver controller module 518 controls the operation of the receiver 108 according to input provided by the data processing module 516. For example, the receiver controller module 618 controls the operation of the receiver 108 to turn on and off such that a wireless stream may be searched at a successive one of multiple equally-spaced sub-intervals during each burst of the wireless stream. Additionally, the receiver controller module 618 may receive data packets from the receiver interface module 514 process those packets to determine whether they are valid to establish sync with the incoming wireless stream. The receiver controller module 618 may determine that incoming packets from the receiver interface module 514 are no longer valid, or determine that no valid packets have been received for a specified period of time to initiate a new power optimization search mode 300 or a re-synchronization mode 400 sequence as described herein with reference to FIGS. 3 and 4.

It should be appreciated that the modules described herein are provided only as an example of a computing device that may execute the application 504 according to the teachings of the present invention, and that other computing devices may have the same modules, different modules, additional modules, or fewer modules than those described herein. For example, one or more modules as described in FIG. 5 may be combined into a single module. As another example, certain modules described herein may be encoded and executed on other circuits, such as another circuit that is separate from the controller 110.

Figure 6:
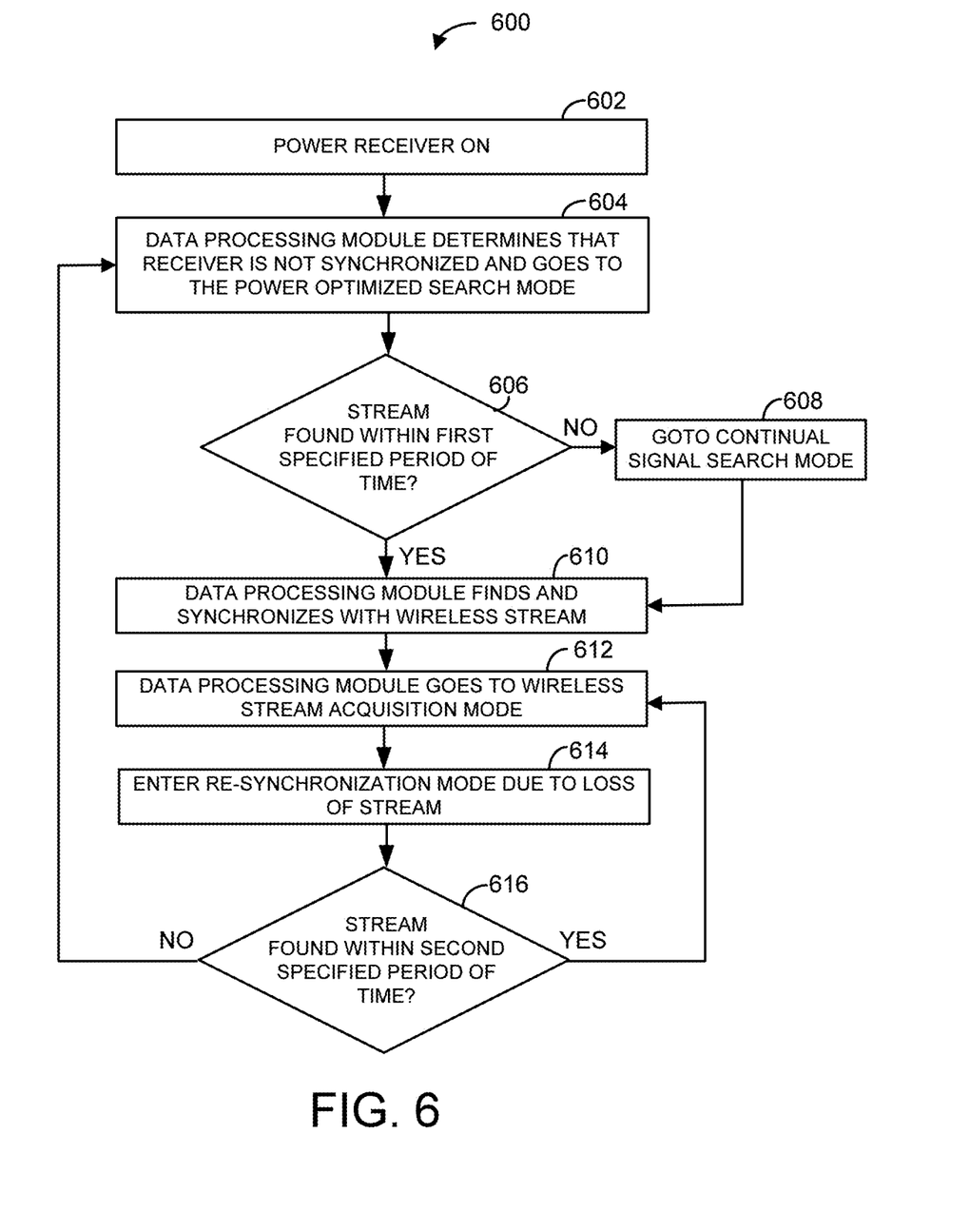
FIG. 6 illustrates an example process that may be performed by the power optimization system in order to optimize power usage in a low power receiver according to one embodiment of the present disclosure.

FIG. 6 illustrates an example process 600 that may be performed by the power optimization system 100 in order to optimize power usage in a low power receiver according to one embodiment of the present disclosure. Initially, the receiver 102 is in an off state (e.g., powered down).

At step 602, the receiver 102 is powered on. Upon initial power on, the data processing module 516 recognizes that the receiver 102 is not synchronized with a wireless stream and therefore places the receiver 102 in the power optimized stream search mode 300 at step 604. That is, the data processing module 516 controls the receiver interface module 514 to search for the bursts during each interval, at a successive one of multiple equally-spaced sub-intervals of each interval that the bursts are transmitted in as described above with reference to FIG. 3.

At step 606, if a first specified period of time has elapsed in which no wireless stream has been detected, the data processing module 516 may control the receiver 108 to go to a continual signal search mode in which the receiver 108 is turned on continually to detect and sync with the wireless stream at step 608. Such behavior may be beneficial for use in noisy environments where the signal to noise ratio is relatively low, and/or in cases where excessive drift or jitter in the relative timing of the transmitter to the receiver has made sync with the wireless stream difficult to attain. Nevertheless, when the wireless stream has been successfully detected, the data processing module 516 sync's the receiver 102 with the wireless stream at step 610.

At step 610, the data processing module 516 goes to the wireless stream acquisition mode 200 by turning on the receiver when the bursts are expected to be received, and turning off the receiver when the bursts are not expected to be received. For example, the data processing module 516 may include a timing circuit that turn on the receiver 108 shortly before the burst is expected to be received and turning the receiver 108 off shortly after the burst is expected to be completed.

In some cases, the wireless stream 104 may include redundant data packets formatted in a set of bursts. In such cases, when the data packets of a first burst are properly received, the data processing module 516 may turn the receiver off during receipt of the remaining redundant bursts, and turn the receiver 108 back on when the first of an ensuing set of redundant data packets are expected to be received.

At step 614, when the wireless stream becomes lost for a relatively short period of time, the data processing module 516 may enter the power optimized re-synchronization mode 400. The power optimized re-synchronization mode 400 may be useful when the receiver 102 has lost sync for a short period of time due to various reasons, including an unexpected drift in the timing of the transmitter 106 and/or receiver 102, slight inconsistencies or inaccuracies of a timing period of the received wireless stream with that of the data processing module 516, and the like. As such, the data processing module 516 may, after loss of sync, re-sync by expanding a window in which the burst are expected to arrive. For example, the data processing module 516 may skip searching for the wireless stream at the next interval following the determination of a lost stream, and search for the wireless stream starting at an interval after the next interval for a duration that is at least twice a duration of the bursts.

At step 616, if the data processing module 516 finds the stream with a second period of time (e.g., five intervals), processing continues at step 612 in which the data processing module 516 enters the wireless stream acquisition mode 200 to continue receiving data from the wireless stream 104. However, if the data processing module 516 does not find and sync with the wireless stream within the second specified period of time, processing continues at step 604 in which the data processing module 516 enters the power optimized search mode 300.

The process described above continues throughout the use of the receiver 102 to receive and process data obtained from the transmitter 106 via the wireless stream 104. Nevertheless, when use of the receiver 102 is no longer needed or desired, the process ends.

Figure 7:
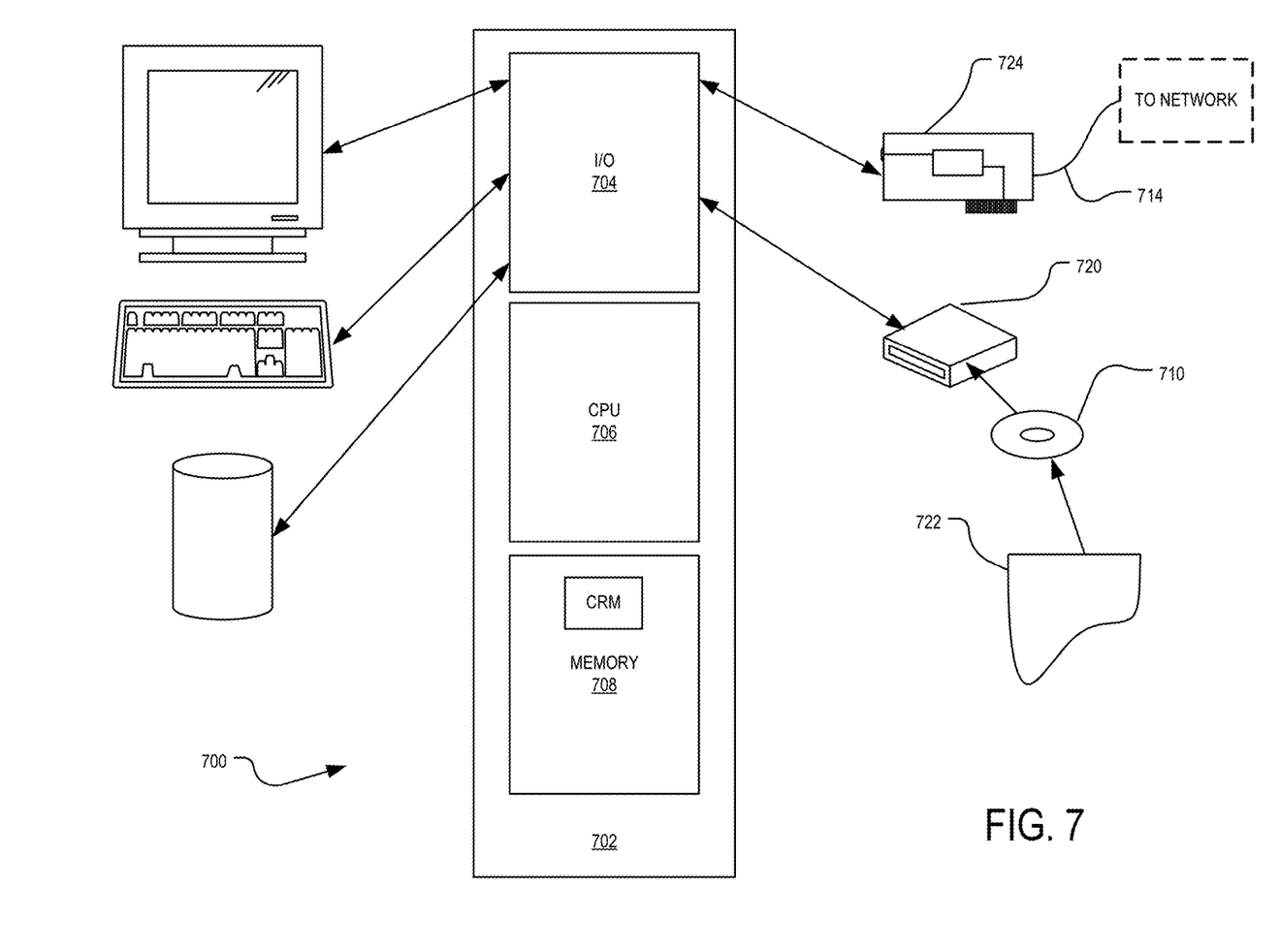
FIG. 7 illustrates a block diagram of an example computer device for use with the example embodiments.

FIG. 7 illustrates an example computing system 700 that may implement various systems, such as the control circuit 118, and methods discussed herein, such as process 600. A general purpose computer system 700 is capable of executing a computer program product to execute a computer process. Data and program files may be input to the computer system 700, which reads the files and executes the programs therein such as the application 504. Some of the elements of a general purpose computer system 700 are shown in FIG. 7 wherein a processing system 702 is shown having an input/output (I/O) section 704, a hardware central processing unit (CPU) 706, and a memory section 708. The processing system 702 of the computer system 700 may have a single hardware central-processing unit 706 or a plurality of hardware processing units. The computer system 700 may be a conventional computer, a server, a distributed computer, or any other type of computing device, such as one or more external computers made available via a cloud computing architecture. The presently described technology is optionally implemented in software devices loaded in memory 708, stored on a configured DVD/CD-ROM 710 or storage unit 712, and/or communicated via a wired or wireless network link 714, thereby transforming the computer system 700 in FIG. 7 to a special purpose machine for implementing the described operations.

The memory section 708 may be volatile media, nonvolatile media, removable media, non-removable media, and/or other hardware media or hardware mediums that can be accessed by a general purpose or special purpose computing device. For example, the memory section 708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 704 is connected to one or more optional user-interface devices (e.g., a user interface such as a keyboard 716 or the user interface 512), an optional disc storage unit 712, an optional display 718, and an optional disc drive unit 720. Generally, the disc drive unit 720 is a DVD/CD-ROM drive unit capable of reading the DVD/CD-ROM medium 710, which typically contains programs and data 722. Computer program products containing mechanisms to effectuate the systems and methods in accordance with the presently described technology may reside in the memory section 708, on a disc storage unit 712, on the DVD/CD-ROM medium 710 of the computer system 700, or on external storage devices made available via a cloud computing architecture with such computer program products, including one or more database management products, web server products, application server products, and/or other additional software components. Alternatively, a disc drive unit 720 may be replaced or supplemented by a tape drive unit, or other storage medium drive unit. An optional network adapter 724 is capable of connecting the computer system 700 to a network via the network link 714, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 700 is connected (by wired connection and/or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are examples of communications devices for and other means of establishing a communications link between the computers may be used.

In an example implementation, source code executed by the control circuit 118, a plurality of internal and external databases optionally are stored in memory of the control circuit 118 or other storage systems, such as the disk storage unit 712 or the DVD/CD-ROM medium 710, and/or other external storage devices made available and accessible via a network architecture. The source code executed by the control circuit 118 may be embodied by instructions stored on such storage systems and executed by the processing system 702.

Some or all of the operations described herein may be performed by the processing system 702, which is hardware. Further, local computing systems, remote data sources and/ or services, and other associated logic represent firmware, hardware, and/or software configured to control operations the system 100 and/or other components. The system set forth in FIG. 7 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
    a receiver to receive a wireless stream comprising ongoing bursts that are transmitted at recurring periodic intervals, each burst comprising one or more data packets; and
    a controller configured to, when the wireless stream is lost for at least a specified quantity of intervals, re-establish reception of the wireless stream by searching for the bursts during each interval wherein the searching is performed for sub-intervals of each interval and wherein the searching is initiated at a position within each interval that is a fraction of a total length of each interval and wherein the fraction increases with each successive interval.

2. The apparatus of claim 1, wherein the controller is configured to:
    when the wireless stream has been determined to be lost because no valid data packets have been received for at least the specified quantity of intervals, skip searching for the wireless stream at a next interval, and search for the wireless stream starting at an interval after the next interval for a duration that is at least twice a duration of the bursts.

3. The apparatus of claim 2, wherein each sub-interval has a duration of at least twice the duration of each burst.

4. The apparatus of claim 2, wherein the controller is executed to, when the wireless stream has not been detected for a specified period of time, turn the receiver on continually to search for the wireless stream.

5. The apparatus of claim 1, wherein the controller is configured to, when the receiver is synchronized with the wireless stream, turn the receiver on when the bursts are expected to be received, and turn the receiver off when the bursts are not expected to be received.

6. The apparatus of claim 5, wherein the controller is configured to, when the one or more data packets of a first of a plurality of bursts is properly received, turn the receiver off during receipt of the remaining plurality of bursts, the plurality of burst comprising a set of redundantly transmitted data packets.

7. The apparatus of claim 1, wherein each interval is a fixed duration.

8. The apparatus of claim 1, wherein the receiver and the controller are configured in a hearing aid.

9. The apparatus of claim 1, wherein the wireless stream conforms to an Enhanced Shockburst (ESB) communication protocol.

10. The apparatus of claim 1, wherein the data packets comprise audio data.

11. A method comprising:
    configuring a receiver to receive a wireless stream comprising ongoing bursts that are transmitted at recurring periodic intervals, each burst comprising one or more data packets; and
    configuring the receiver to, when the wireless stream is lost for at least a specified quantity of intervals, re-establish reception of the wireless stream by searching for the bursts during each interval wherein the searching is initiated at a distance into an interval and the distance is increased with each successive interval.

12. The method of claim 11, further comprising:
    when the wireless stream has been determined to be lost because no valid data packets have been received for at least the specified quantity of intervals, skipping the searching for the wireless stream at a next interval, and searching for the wireless stream starting at an interval after the next interval for a duration that is at least twice a duration of the bursts.

13. The method of claim 11, wherein the searching is performed within each interval for a sub-interval having a duration of at least twice the duration of each burst.

14. The method of claim 13, further comprising, when the wireless stream has not been detected for a specified period of time, turning the receiver on continually to search for the wireless stream.

15. A method comprising:
configuring a receiver to receive a wireless stream comprising ongoing bursts that are transmitted at recurring periodic intervals, each burst comprising one or more data packets wherein when the receiver is synchronized with the wireless stream, turning the receiver on when the bursts are expected to be received, and turn the receiver off when the bursts are not expected to be received; and
configuring the receiver to, when the wireless stream is lost for at least a specified quantity of intervals, re-establish reception of the wireless stream by searching for the bursts during each interval at a successive one of multiple equally-spaced sub-intervals of each interval.

16. The method of claim 15, further comprising, when the data packets of a first of a plurality of bursts is properly received, turning the receiver off during receipt of remaining bursts of the plurality of bursts, the plurality of burst comprising a set of redundantly transmitted data packets.

17. The method of claim 11, wherein the recurring periodic intervals have a fixed duration.

18. The method of claim 11, wherein the receiver and the controller are configured in a hearing aid.

19. The method of claim 11, wherein the wireless stream conforms to an Enhanced Shockburst (ESB) communication protocol.

20. An apparatus comprising:
a receiver to receive a wireless stream comprising ongoing bursts that are transmitted at recurring periodic intervals, each burst comprising one or more data packets, the wireless stream conforming to an Enhanced Shockburst (ESB) protocol; and
a controller configured to, when the wireless stream is lost for at least a specified quantity of intervals, re-establish reception of the wireless stream by searching for the bursts during each interval, at a successive one of multiple equally-spaced sub-intervals of each interval; and
when the receiver is synchronized with the wireless stream, turn the receiver on when the bursts are expected to be received, and turn the receiver off when the bursts are not expected to be received, wherein when the data packets of a first of a plurality of bursts is properly received, turn the receiver off during receipt of the remaining plurality of bursts, the plurality of burst comprising a set of redundantly transmitted data packets, wherein the apparatus is a hearing aid powered by a battery.

* * * * *